US012718466B2

(12) United States Patent
Kensler et al.

(10) Patent No.: US 12,718,466 B2
(45) Date of Patent: Aug. 25, 2026

(54) SIMPLIFIED LOW-PRECISION RAY INTERSECTION THROUGH ACCELERATED HIERARCHY STRUCTURE PRECOMPUTATION

(71) Applicants: Advanced Micro Devices, Inc., Santa Clara, CA (US); ATI Technologies ULC, Markham (CA)

(72) Inventors: Andrew Erin Kensler, Bellevue, WA (US); Sean Keely, Austin, TX (US); Michael John Livesley, Milton Keynes (GB); David William John Pankratz, Markham (CA)

(73) Assignees: Advanced Micro Devices, Inc., Santa Clara, CA (US); ATI Technologies ULC, Markham (CA)

( * ) Notice: Subject to any disclaimer, the term of this patent is extended or adjusted under 35 U.S.C. 154(b) by 301 days.

(21) Appl. No.: 18/478,259

(22) Filed: Sep. 29, 2023

(65) Prior Publication Data

US 2025/0111587 A1 Apr. 3, 2025

(51) Int. Cl.
*G06T 15/06* (2011.01)
*G06T 17/00* (2006.01)

(52) U.S. Cl.
CPC ............ *G06T 15/06* (2013.01); *G06T 17/005* (2013.01); *G06T 2210/21* (2013.01)

(58) Field of Classification Search
CPC .... G06T 15/06; G06T 17/005; G06T 2210/21
See application file for complete search history.

(56) References Cited

U.S. PATENT DOCUMENTS

2016/0110910 A1* 4/2016 Obert .................... G06T 15/005 345/426
2017/0178387 A1* 6/2017 Woop ...................... G06T 15/08
2018/0082466 A1* 3/2018 Akenine-Moller ... G06T 15/005
2018/0182158 A1* 6/2018 Karras .................... G06T 15/06
2020/0211261 A1* 7/2020 Janus .................... G06T 17/005
2020/0320776 A1* 10/2020 Doyle ....................... G06T 9/00
2021/0287455 A1* 9/2021 Yang ....................... G06F 3/011
2021/0390756 A1* 12/2021 Muthler ................ G06T 17/005
2022/0270319 A1* 8/2022 Doyle ................... G06T 15/005
2024/0404172 A1* 12/2024 Burns ..................... G06T 15/06

* cited by examiner

*Primary Examiner* — Michael Le
(74) *Attorney, Agent, or Firm* — Volpe Koenig

(57) ABSTRACT

Devices and methods for rendering objects using ray tracing are provided which include during a build time: generating an accelerated hierarchy structure comprising data representing an approximate volume bounding a group of geometric shapes representing the objects in the scene and data representing the geometric shapes; and generating additional data used to transform rays, to be cast in the scene, from a high precision space to a low precision space; and during a render time occurring after the build time: performing ray intersection tests, using the additional data generated during the build time, for the rays in the scene; and rendering the scene based on the ray intersection tests. Because the additional data is generated prior to render time, the additional data can be used to perform the ray intersection testing more efficiently.

20 Claims, 8 Drawing Sheets

SIMPLIFIED LOW-PRECISION RAY INTERSECTION THROUGH ACCELERATED HIERARCHY STRUCTURE PRECOMPUTATION

BACKGROUND

Ray tracing is a rendering technique used in computer graphics for generating an image in which simulated rays of light are cast to test for object intersection and pixels are illuminated and colored based on the result of the ray cast. The path of light is traced as pixels in an image plane and the effects of its encounters are simulated with virtual objects. Ray tracing is computationally more expensive than rasterization-based techniques, but produces more physically accurate results. Improvements in ray tracing operations are constantly being made.

BRIEF DESCRIPTION OF THE DRAWINGS

A more detailed understanding may be had from the following description, given by way of example in conjunction with the accompanying drawings wherein.

DETAILED DESCRIPTION

Figure 1:
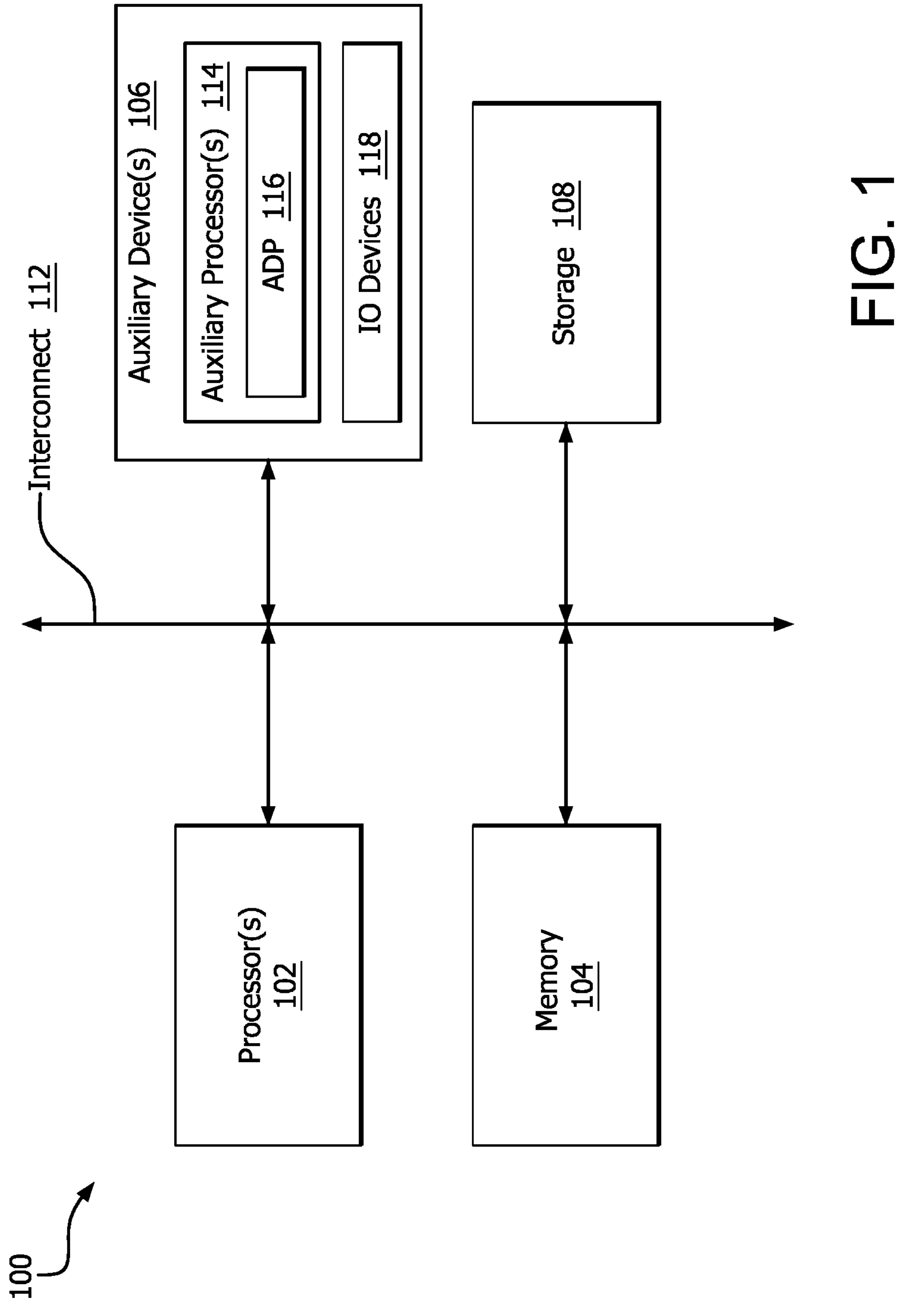
FIG. 1 is a block diagram of an example computing device in which one or more features of the disclosure can be implemented.

Each ray intersection test is complex and expensive in terms of processing resources. Accordingly, accelerated hierarchy structures, such as a bounding volume hierarchy (BVH) are used to implement ray tracing more efficiently to make accurate determinations. As described in more detail herein, the BVH data is typically stored in memory (e.g., random access memory (RAM)) to be accessed frequently during rendering. The BVH data includes both the data representing the bounding volumes and, in the leaf nodes, data representing the actual geometric objects.

While an accelerated hierarchy structure (e.g., a BVH structure) implements ray tracing more efficiently, a large amount of data is often used to represent each primitive (e.g., each node) of the BVH structure and, therefore, a large amount of memory is consumed to implement the BVH structure for ray tracing. In fact, the BVH data used to represent more complex scenes is typically too large to fit into the memory of an accelerated processor (e.g., GPU).

For simplified explanation purposes, the basic steps involved in a ray tracing algorithm include a setup stage, a transform stage, ray generation, intersection testing, shading and ray termination. During the setup stage, a scene to be rendered is defined, which includes defining all the objects, their properties (such as color, texture, and material), and their positions within the scene, as well as setting up lights and a camera. The scene is typically represented as a collection of geometric primitives (like spheres, triangles, etc.). In addition, the number of rays to be sent out from the camera is determined based on the resolution of the image.

During the transform stage, each object in the scene is defined in its own object space. But for the purposes of ray tracing, these objects are transformed into a common coordinate system (e.g., "world space," "camera space," or "view space"). The transformation is typically done using a series of geometric transformations, such as translation, rotation, and scaling. Rays are then generated, for each pixel in the image, from the camera. Each ray represents a possible path that light could take to reach the camera. Each ray is then tested for intersection with all objects in the scene to determine the object that the ray hits first (if any). Ray intersection can be a computationally expensive step, especially for complex scenes, so various algorithms (e.g., bounding volume hierarchies, k-dimensional (k-d) trees, binary space partitioning (bsp) trees and grids, such as uniform grids and hierarchical grids) are used to speed up this process.

When the first object that a ray intersects is determined, the color of the corresponding pixel (corresponding to the object) is calculated using a shading algorithm that takes into account the object's material properties, the angle of the incoming ray, and the positions and properties of lights in the scene. Some algorithms also take into account secondary rays for effects like reflection, refraction, and shadows. A ray is terminated when it either does not hit any object (in which case it often takes on the color of the background) or after a certain number of reflections or refractions to prevent infinite loops and manage computational complexity.

The end result of the ray tracing process is a 2D image representing the 3D scene from the perspective of the camera. As described above, the ray tracing process is merely an example for simplified explanation of ray tracing. Many variants of the basic ray tracing algorithm exist, incorporating various optimizations and additional features to produce more realistic or stylized results.

Prior to rendering a scene, the ray tracing process includes a "build time." During the "build time," the scene is setup by loading and parsing the scene file, which can contain a large amount of data describing the geometry, textures, materials, lighting, and other properties of the scene. The data structures (e.g., BVH structures) used to speed up the ray tracing process are constructed during the "build time." After the data structures are constructed, the actual ray tracing (ray generation, intersection testing, shading, etc.) is performed during a "render time."

Ray tracing performance can be characterized by the total number of intersection tests (e.g., tests to determine whether a ray intersects a triangle) run for each of the rays traced through a BVH. Accordingly, running more intersection tests per clock cycle improves ray tracing performance. However, running more intersection tests per clock cycle includes using more computation (e.g., arithmetic) and memory bandwidth and, therefore, comes at a cost of increased silicon area.

One technique for increasing ray tracing performance while reducing the silicon area cost is to perform the ray intersection arithmetic (for the ray intersection tests) using low precision, fixed point calculations (i.e., fixed point intersection tests) rather than high precision, floating point calculations (i.e., floating point intersection tests). Fixed point intersection tests typically require less memory and less time to perform than floating point intersection tests. However, the fixed point intersection tests operate differently than the floating point intersection tests.

For example, fixed point intersection tests typically include placing a ray and an object in a three dimensional (3D) grid space (where each unit (i.e., cell) of the grid space is the same size) and performing a "ray setup" process. The ray setup process includes transforming a floating point ray from a high precision space to a low precision space (e.g., translating an origin and a direction of the floating point ray to the same units as the grid space, such as normalizing the origin and direction of the ray to a unit of the grid space).

Some conventional ray tracing techniques include computing the transformations for the floating point rays (from high precision space to low precision space) in an attempt to simplify intersection complexity. For example, these conventional techniques include computing the reciprocal of the ray direction to simplify ray-box operations and expressing the subordinate directions of the ray according to a dominant direction to simplify ray-triangle operations. However, these computations must be performed at "render time" and must be performed for each ray (e.g., using a two-level BVH) after the direction of the ray is determined, which results in increased time and power consumption to render a scene.

Features of the represent disclosure provide devices and methods for efficiently rendering objects in a scene using ray tracing by performing a portion of the ray setup procedure during "build time" (i.e., prior to "render time").

During the "build time," additional data (data in addition to the conventional data stored for the BVH) is computed for a portion of the ray setup process and stored in memory as part of the BVH data. As a result of computing and storing this additional data during the "build time," the number of intersection tests (e.g., per clock cycle) can be increased without increasing the amount of computation (e.g., arithmetic) and memory bandwidth (i.e., without increasing silicon area cost). Features of the present disclosure can be implemented for ray-triangle operations, ray-box operations, and other primitives benefitting from low-precision intersection.

Examples of additional data computed and stored during "build time" as part of the of the ray setup process include, but are not limited to: computing a reciprocal of bounding box dimensions around one or more primitives (e.g., one or more triangles); computing minimum points, center points and maximum points on the bounding box that may be used to translate the ray origin; computing quantized copies of full precision triangle vertices and full precision bounding box components; and computing values which can be substituted for ray origin components based on the entering faces and exit faces of the bounding box or other planes within the box.

A method for rendering objects in a scene using ray tracing. The method comprises, during a build time: generating an accelerated hierarchy structure comprising data representing an approximate volume bounding a group of geometric shapes representing the objects in the scene and data representing the geometric shapes; and generating additional data used to transform rays, to be cast in the scene, from a high precision space to a low precision space. The method comprises, during a render time occurring after the build time: performing ray intersection tests, using the additional data generated during the build time, for the rays in the scene; and rendering the scene based on the ray intersection tests.

A processing device for rendering objects in a scene using ray tracing is provided which comprises memory and a processor. The processor is configured to during a build time: generate an accelerated hierarchy structure comprising data representing an approximate volume bounding a group of geometric shapes representing the objects in the scene and data representing the geometric shapes; and generate additional data used to transform rays, to be cast in the scene, from a high precision space to a low precision space. The processor is configured to during a render time occurring after the build time: perform ray intersection tests, using the additional data generated during the build time, for the rays in the scene; and render the scene based on the ray intersection tests.

A non-transitory computer readable medium is provided which comprises instructions thereon for causing a computer to execute a method for rendering objects in a scene using ray tracing. The instructions comprise, during a build time, generating an accelerated hierarchy structure comprising data representing an approximate volume bounding a group of geometric shapes representing the objects in the scene and data representing the geometric shapes, and generating additional data used to transform rays, to be cast in the scene, from a high precision space to a low precision space. The instructions also comprise, during a render time occurring after the build time, performing ray intersection tests, using the additional data generated during the build time, for the rays in the scene; and rendering the scene based on the ray intersection tests.

FIG. 1 is a block diagram of an example computing device 100 in which one or more features of the disclosure can be implemented. In various examples, the computing device 100 is one of, but is not limited to, for example, a computer, a gaming device, a handheld device, a set-top box, a television, a mobile phone, a tablet computer, or other computing device. The device 100 includes, without limitation, one or more processors 102, a memory 104, one or more auxiliary devices 106 and storage 108. An interconnect 112, which can be a bus, a combination of buses, and/or any other communication component, communicatively links the processor(s) 102, the memory 104, the auxiliary device(s) 106 and the storage 108.

In various alternatives, the processor(s) 102 include a central processing unit (CPU), a graphics processing unit (GPU), a CPU and GPU located on the same die, or one or more processor cores, wherein each processor core can be a CPU, a GPU, or a neural processor. In various alternatives, at least part of the memory 104 is located on the same die as one or more of the processor(s) 102, such as on the same chip or in an interposer arrangement, and/or at least part of the memory 104 is located separately from the processor(s) 102. The memory 104 includes a volatile or non-volatile memory, for example, random access memory (RAM), dynamic RAM, or a cache.

The storage 108 includes a fixed or removable storage, for example, without limitation, a hard disk drive, a solid state drive, an optical disk, or a flash drive. The auxiliary device(s) 106 include, without limitation, one or more auxiliary processors 114, and/or one or more input/output ("IO") devices. The auxiliary processor(s) 114 include, without limitation, a processing unit capable of executing instructions, such as a central processing unit, graphics processing unit, parallel processing unit capable of performing compute shader operations in a single-instruction-multiple-data form, multimedia accelerators such as video encoding or decoding accelerators, or any other processor. Any auxiliary processor 114 is implementable as a programmable processor that executes instructions, a fixed function processor that processes data according to fixed hardware circuitry, a combination thereof, or any other type of processor. In some examples, the auxiliary processor(s) 114 include an accelerated processing device ("APD") 116. In addition, although processor(s) 102 and APD 116 are shown separately in FIG. 1, in some examples, processor(s) 102 and APD 116 may be on the same chip.

The one or more IO devices 118 include one or more input devices, such as a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals), and/or one or more output devices such as a display, a speaker, a printer, a haptic feedback device, one or more lights, an antenna, or a network connection (e.g., a wireless local area network card for transmission and/or reception of wireless IEEE 802 signals).

Figure 2:
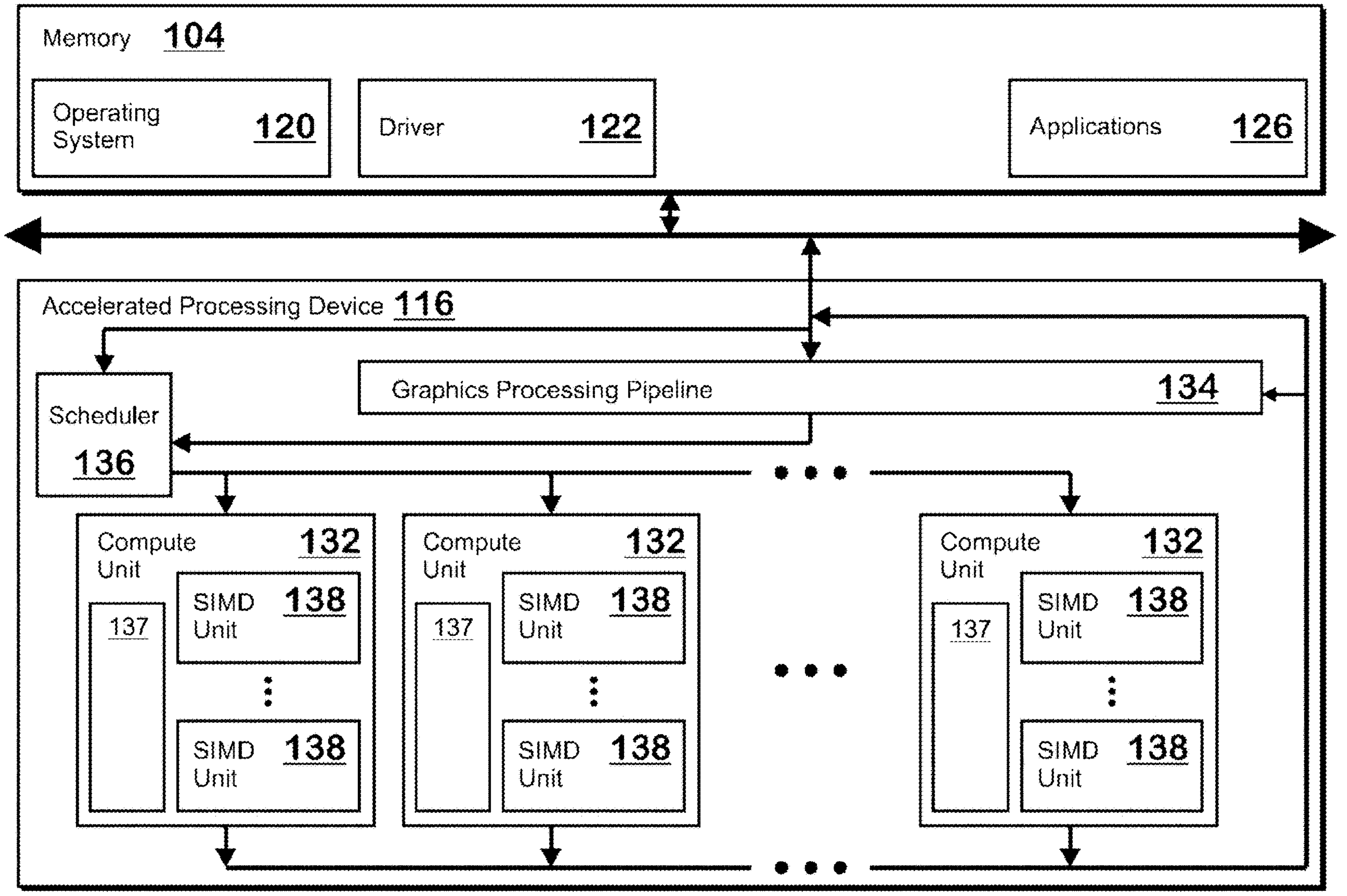
FIG. 2 is a block diagram of the device, illustrating additional details related to execution of processing tasks on an accelerated processing device, according to an example.

FIG. 2 is a block diagram of the device, illustrating additional details related to execution of processing tasks on the APD 116, according to an example. The processor 102 maintains, in system memory 104, one or more control logic modules for execution by the processor(s) 102. The control logic modules include an operating system 120, a driver 122, and applications 126, and may optionally include other modules not shown. These control logic modules control various aspects of the operation of the processor(s) 102 and the APD 116. For example, the operating system 120 directly communicates with hardware and provides an interface to the hardware for other software executing on the processor(s) 102. The driver 122 controls operation of the APD 116 by, for example, providing an application programming interface ("API") to software (e.g., applications 126) executing on the processor(s) 102 to access various functionality of the APD 116. The driver 122 also includes a just-in-time compiler that compiles shader code into shader programs for execution by processing components (such as the SIMD units 138 discussed in further detail below) of the APD 116.

The APD 116 executes commands and programs for selected functions, such as graphics operations and non-graphics operations, which may be suited for parallel processing. The APD 116 can be used for executing graphics pipeline operations such as pixel operations, geometric computations, and rendering an image to a display device (e.g., one of the IO devices 118) based on commands received from the processor(s) 102. The APD 116 also executes compute processing operations that are not directly related to graphics operations, such as operations related to machine learning training or inference, video, or other tasks, based on commands received from the processor 102 or that are not part of the "normal" information flow of a graphics processing pipeline, or that are completely unrelated to graphics operations (sometimes referred to as "GPGPU" or "general purpose graphics processing unit").

The APD 116 includes compute units 132 (which may collectively be referred to herein as "programmable processing units") that include one or more SIMD units 138 that are configured to perform operations in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but can execute that instruction with different data. Lanes can be switched off with predication if not all lanes need to execute a given instruction. Predication can also be used to execute programs with divergent control flow. More specifically, for programs with conditional branches or other instructions where control flow is based on calculations performed by individual lanes, predication of lanes corresponding to control flow paths not currently being executed, and serial execution of different control flow paths, allows for arbitrary control flow to be followed.

The basic unit of execution in compute units 132 is a work-item. Each work-item represents a single instantiation of a shader program that is to be executed in parallel in a particular lane of a wavefront. Work-items can be executed simultaneously as a "wavefront" on a single SIMD unit 138. Multiple wavefronts may be included in a "work group," which includes a collection of work-items designated to execute the same program. A work group can be executed by executing each of the wavefronts that make up the work group. The wavefronts may be executed sequentially on a single SIMD unit 138 or partially or fully in parallel on different SIMD units 138. Wavefronts can be thought of as instances of parallel execution of a shader program, where each wavefront includes multiple work-items that execute simultaneously on a single SIMD unit 138 in line with the SIMD paradigm (e.g., one instruction control unit executing the same stream of instructions with multiple data). A command processor 137 is present in the compute units 132 and launches wavefronts based on work (e.g., execution tasks) that is waiting to be completed. A scheduler 136 is configured to perform operations related to scheduling various wavefronts on different compute units 132 and SIMD units 138.

The parallelism afforded by the compute units 132 is suitable for graphics related operations such as pixel value calculations, vertex transformations, tessellation, geometry shading operations, and other graphics operations. A graphics processing pipeline 134 which accepts graphics processing commands from the processor(s) 102 thus provides computation tasks to the compute units 132 for execution in parallel.

The compute units 132 are also used to perform computation tasks not related to graphics or not performed as part of the "normal" operation of a graphics processing pipeline 134 (e.g., custom operations performed to supplement processing performed for operation of the graphics processing pipeline 134). An application 126 or other software executing on the processor(s) 102 transmits programs (often referred to as "compute shader programs," which may be compiled by the driver 122) that define such computation tasks to the APD 116 for execution. Although the APD 116 is illustrated with a graphics processing pipeline 134, the teachings of the present disclosure are also applicable for an APD 116 without a graphics processing pipeline 134.

Figure 3:
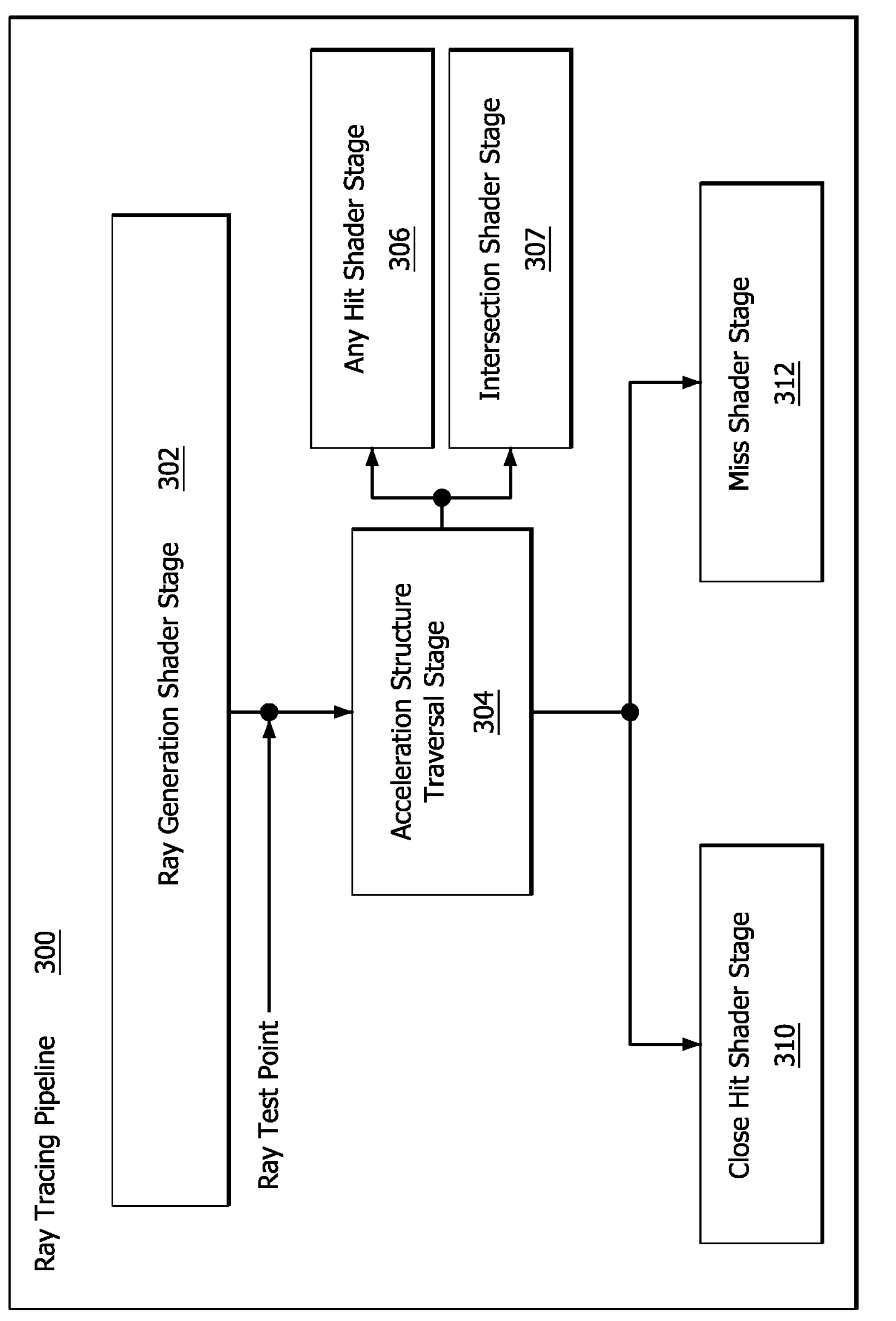
FIG. 3 illustrates a ray tracing pipeline for rendering graphics using a ray tracing technique, according to an example.

FIG. 3 illustrates a ray tracing pipeline 300 for rendering graphics using a ray tracing technique, according to an example. The ray tracing pipeline 300 provides an overview of operations and entities involved in rendering a scene utilizing ray tracing. A ray generation shader 302, any hit shader 306, intersection shader 307, closest hit shader 310, and miss shader 312 are shader-implemented stages that represent ray tracing pipeline stages whose functionality is performed by shader programs executing on the SIMD unit 138. Any of the specific shader programs at each particular shader-implemented stage are defined by application-provided code (i.e., by code provided by an application developer that may pre-compiled by an application compiler and/or compiled by the driver 122). It should be noted that in variations, these stages can be implemented using specialized, fixed function or programmable circuitry. The acceleration structure traversal stage 304 performs the ray intersection test to determine whether a ray hits a triangle. The other programmable shader stages (ray generation shader 302, any hit shader 306, closest hit shader 310, miss shader 312) are implemented as shader programs that execute on the SIMD units 138. The acceleration structure traversal stage may be implemented in software (e.g., as a shader program executing on the SIMD units 138), in hardware, or as a combination of hardware and software. The ray tracing pipeline 300 may be orchestrated partially or fully in software or partially or fully in hardware, and may be orchestrated by the processor 102, the scheduler 136, by a combination thereof, or partially or fully by any other hardware and/or software unit. In examples, traversal through the ray tracing pipeline 300 is performed partially or fully by the scheduler 136, either autonomously or under control of the processor 102, or partially or fully by a shader program (such as a BVH traversal shader program) executing on one or more of the SIMD units 138. In some examples, testing a ray against boxes and triangles (inside the acceleration structure traversal stage 304) is hardware accelerated (meaning that a fixed function hardware unit performs the steps for those tests). In other examples, such testing is performed by software such as a shader program executing on one or more SIMD units 138. Herein, where the phrase "the ray tracing pipeline does [a task]" is used, this means that the hardware and/or software that implements the ray tracing pipeline 300 does that task.

The ray tracing pipeline 300 operates in the following manner. A ray generation shader 302 is executed. The ray generation shader 302 sets up data for a ray to test against a triangle and requests the acceleration structure traversal stage 304 test the ray for intersection with triangles.

The acceleration structure traversal stage 304 traverses an acceleration structure, which is a data structure that describes a scene volume and objects within the scene, and tests the ray against triangles in the scene. During this traversal, for triangles that are intersected by the ray, the ray tracing pipeline 300 triggers execution of an any hit shader 306 and/or an intersection shader 307 if those shaders are specified by the material of the intersected triangle. Note that multiple triangles can be intersected by a single ray. It is not guaranteed that the acceleration structure traversal stage will traverse the acceleration structure in the order from closest-to-ray-origin to farthest-from-ray-origin. The acceleration structure traversal stage 304 triggers execution of a closest hit shader 310 for the triangle closest to the origin of the ray that the ray hits, or, if no triangles were hit, triggers a miss shader.

Note, it is possible for the any hit shader 306 or intersection shader 307 to "reject" an intersection from the acceleration structure traversal stage 304, and thus the acceleration structure traversal stage 304 triggers execution of the miss shader 312 if no intersections are found to occur with the ray or if one or more intersections are found but are all rejected by the any hit shader 306 and/or intersection shader 307. An example circumstance in which an any hit shader 306 may "reject" a hit is when at least a portion of a triangle that the acceleration structure traversal stage 304 reports as being hit is fully transparent (e.g., a cutout texture for plant leaves). Because the acceleration structure traversal stage 304 only tests geometry, and not transparency, the any hit shader 306 that is invoked due to an intersection with a triangle having at least some transparency may determine that the reported intersection should not count as a hit due to "intersecting" a transparent portion of the triangle. A typical use for the closest hit shader 310 is to color a ray based on a texture for the material. A typical use for the miss shader 312 is to color a ray with a color set by a skybox. It should be understood that the shader programs defined for the closest hit shader 310 and miss shader 312 may implement a wide variety of techniques for coloring ray and/or performing other operations.

A typical way in which ray generation shaders 302 generate rays is with a technique referred to as backwards ray tracing. In backwards ray tracing, the ray generation shader 302 generates a ray having an origin at the point of the camera (i.e., the eye of the viewer). The point at which the ray intersects a plane defined to correspond to the screen defines the pixel on the screen whose color the ray is being used to determine. If the ray hits an object, that pixel is colored based on the closest hit shader 310. If the ray does not hit an object, the pixel is colored based on the miss shader 312. Multiple rays may be cast per pixel, with the final color of the pixel being determined by some combination of the colors determined for each of the rays of the pixel.

It is possible for any of the any hit shader 306, intersection shader 307, closest hit shader 310, and miss shader 312, to spawn their own rays, which enter the ray tracing pipeline 300 at the ray test point. These rays can be used for any purpose. One common use is to implement environmental lighting or reflections. In an example, when a closest hit shader 310 is invoked, the closest hit shader 310 spawns rays in various directions. For each object, or a light, hit by the spawned rays, the closest hit shader 310 adds the lighting intensity and color to the pixel corresponding to the closest hit shader 310. It should be understood that although some examples of ways in which the various components of the ray tracing pipeline 300 can be used to render a scene have been described, any of a wide variety of techniques may alternatively be used.

As described above, the determination of whether a ray intersects an object is referred to herein as a "ray intersection test." The ray intersection test involves shooting a ray from an origin and determining whether the ray intersects a triangle and, if so, what distance from the origin the triangle intersection is at. For efficiency, the ray tracing test uses a representation of space referred to as a bounding volume hierarchy. This BVH is the "acceleration structure" referred to elsewhere herein. In a BVH, each non-leaf node represents a bounding volume (e.g., an axis aligned bounding box (AABB), an oriented bounding box (OBB) rotated off-axis or other type of bounding volume) that bounds the geometry of all children of that node. For simplified explanation purposes, AAABs are used to represent bounding volumes in the examples described herein. However, features of the present disclosure can be implemented using any type of bounding volume to bound a sub-tree portion of the BVH.

In addition, acceleration structures can be classified as either spatial subdivision (e.g., k-d trees, bsp trees, and grids) or object subdivision acceleration structures (e.g., BVHs). Spatial subdivision structures subdivide a space into mutually exclusive regions, but the objects that span these regions can be shared by nodes for multiple regions. Conversely, object subdivision structures subdivide the objects into mutually exclusive subsets, but the spaces that these subsets occupy can overlap. In some cases, because BVHs are object subdivision structures, AABBs can overlap and not be fully mutually exclusive. For simplified explanation purposes, BVHs are used as acceleration structures in the examples described herein. However, features of the present disclosure can be implemented using any type of acceleration structure.

In an example, the base node represents the maximal extents of an entire region for which the ray intersection test is being performed. In this example, the base node has two children that each represent mutually exclusive AABBs that subdivide the entire region. Each of those two children has two child nodes that represent AABBs that subdivide the space of their parents, and so on. Leaf nodes represent a triangle or other geometry against which a ray intersection test can be performed.

The BVH data structure allows the number of ray-triangle intersections (which are complex and thus expensive in terms of processing resources) to be reduced as compared with a scenario in which no such data structure were used and therefore all triangles in a scene would have to be tested against the ray. Specifically, if a ray does not intersect a particular bounding box, and that bounding box bounds a large number of triangles, then all triangles in that box can be eliminated from the test. Thus, a ray intersection test is performed as a sequence of tests of the ray against AABBs, followed by tests against triangles. The tests against AABBs and triangles can be intermingled. But the tests against a particular triangle are preceded by the tests against the parent AABBs that contain the triangle.

Figure 4:
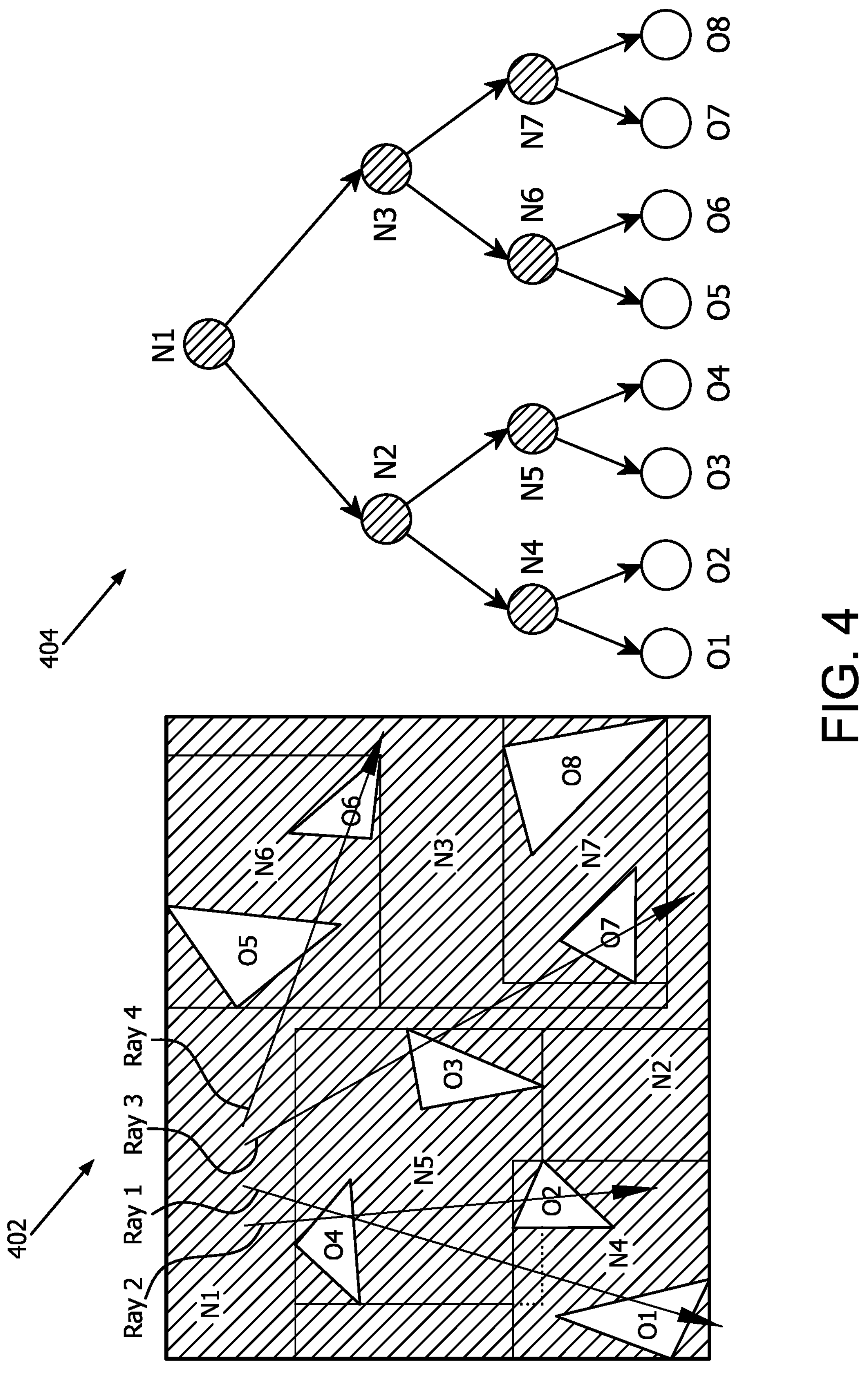
FIG. 4 is an illustration of a bounding volume hierarchy, according to an example.

FIG. 4 is an illustration of a BVH, according to an example. For simplicity, the hierarchy is shown in 2 dimensions. However, extension to higher dimensions (e.g., 3 dimensions or 4 dimensions such as when a time dimension is used (e.g., motion blur) or another dimension for level-of-detail) is simple, and it should be understood that the tests described herein would generally be performed in 3 or more dimensions.

The spatial representation 402 of the BVH is illustrated in the left side of FIG. 4 and the tree representation 404 of the BVH is illustrated in the right side of FIG. 4. The non-leaf nodes are represented with the letter "N" and the leaf nodes are represented with the letter "O" in both the spatial representation 402 and the tree representation 404.

For simplified explanation purposes, triangles are shown as the primitives in the example shown in FIG. 4. However, features of the present disclosure can include other types of primitives. For example, primitives can include spheres (e.g., for rendering particles in a scene), as well as capsules and capsule chains (e.g., for rendering curves in a scene and nodes of a BVH tree can include the capsules). In addition, intersection shaders on AABBs are typically used to provide support for user-defined primitives.

A conventional ray intersection test for tree representation 404 would be performed by traversing through the tree 404, and, for each non-leaf node tested, eliminating branches below that node if the test for that non-leaf node fails. However, when a ray intersects an AABB (i.e., if the test for a non-leaf node succeeds), conventional ray traversal algorithms will continue traversal within the AABB until the test reaches a leaf node. For example, if the ray intersects $O_5$ but no other triangle, the conventional ray intersection test would test against $N_1$, determining that a ray intersects an AABB (i.e., the test succeeds for $N_1$). The test would test against $N_2$, determining that the test fails (since $O_5$ is not within $N_2$) and the test would eliminate all sub-nodes of $N_2$. Because the test against $N_1$ resulted in a determination that the ray intersected an AABB, traversal would continue to the child nodes of $N_1$, and would test against $N_3$, determining that a ray intersects an AABB (i.e., the test succeeds). Because the test against $N_3$ resulted in a determination that the ray intersected an AABB, traversal would again continue to the child nodes of $N_3$, and would test $N_6$ and $N_7$, determining that $N_6$ succeeds but $N_7$ fails. The test would test $O_5$ and $O_6$, noting that $O_5$ succeeds but $O_6$ fails. Instead of testing 8 triangle tests, two triangle tests ($O_5$ and $O_6$) and five box tests ($N_1$, $N_2$, $N_3$, $N_6$, and $N_7$) are performed.

The ray tracing pipeline 300 casts rays to detect whether the rays hit triangles and how such hits should be shaded (e.g., how to calculate levels of brightness and color of pixels representing objects) during the rendering of a 3D scene.

Each triangle is associated with a hit group in a shader binding table, which specifies which closest hit shader should be executed for that triangle at the closest hit shader stage 310, as well as whether an any hit shader should be executed at the any hit shader stage 306, whether an intersection shader should be executed at the intersection shader stage 307, and the specific any hit shader and intersection shader to execute at those stages if those shaders are to be executed. Typically, a ray-triangle intersector implemented in hardware is used for intersecting triangles exclusively without an intersection shader, and instead, any intersection shaders are associated with an empty AABB (e.g., instead of a triangle) at the leaf node.

Thus, in shooting a ray, the ray tracing pipeline 300 evaluates intersections detected at the acceleration structure traversal stage 304 as follows. If a ray is determined to intersect a triangle, then if the material for that triangle has at least an any hit shader or an intersection shader, the ray tracing pipeline 300 runs the intersection shader and/or any hit shader to determine whether the intersection should be deemed a hit or a miss. If neither an any hit shader or an intersection shader is specified for a particular material, then an intersection reported by the acceleration structure traversal 304 with a triangle having that material is deemed to be a hit.

Some examples of situations where an any hit shader or intersection shader do not count intersections as hits are now provided. In one example, if alpha is 0, meaning fully transparent, at the point that the ray intersects the triangle, then the any hit shader deems such an intersection to not be a hit. In another example, an any hit shader determines that the point that the ray intersects the triangle is deemed to be at a "cutout" portion of the triangle (where a cutout "cuts out" portions of a triangle by designating those portions as portions that a ray cannot hit), and therefore deems that intersection to not be a hit.

Once the acceleration structure has been fully traversed, the ray tracing pipeline 300 runs the closest hit shader 310 on the closest triangle determined to hit the ray. As with the any hit shader 306 and the intersection shader 307, the closest hit shader 310 to be run for a particular triangle is dependent on the material assigned to that triangle.

In sum, a ray tracing pipeline 300 typically traverses the acceleration structure 304, determining which triangle is the closest hit for a given ray. The any hit shaders and intersection shaders evaluate intersections—potential hits—to determine if those intersections should be counted as actual hits. Then, for the closest triangle whose intersection is counted as an actual hit, the ray tracing pipeline 300 executes the closest hit shader for that triangle. If no triangles count as a hit, then the ray tracing pipeline 300 executes the miss shader for the ray.

Operation of typical ray tracing pipeline 300 is now discussed with respect to the example rays 1-4 illustrated in FIG. 4. For each of the example rays 1-4, the ray tracing pipeline 300 determines which triangles (or other primitives, such as capsules as described in more detail below) those rays intersect. The ray tracing pipeline 300 executes appropriate any hit shaders 306 and/or intersection shaders 307, as specified by the materials of the intersected triangles, in order to determine the closest hit that does not miss (and thus the closest-hit triangle). The ray tracing pipeline 300 runs the closest hit shader for that closest-hit triangle.

In an example, for ray 1, the ray racing pipeline 300 runs the closest hit shader for O4 unless that triangle had an any hit shader or intersection shader that, when executed, indicated that ray 1 did not hit that triangle. In that situation, the ray tracing pipeline 300 would run the closest hit shader for O1 unless that triangle had an any hit shader or intersection shader indicating that triangle was not hit by ray 1, and in that situation, the ray tracing pipeline 300 would execute a miss shader 312 for ray 1. Similar operations would occur for rays 2, 3, and 4. For ray 2, the ray tracing pipeline 300 determines that intersections occur with O2 and O4, executes an any hit and/or an intersection shader for those triangles if specified by the material, and runs the appropriate closest hit or miss shader. For rays 3 and 4, the ray tracing pipeline 300 determines intersections as shown (ray 3 intersects O3 and O7 and ray 4 intersects O5 and O6), executes appropriate any hit and an/or intersection shaders, and executes appropriate closest hit or miss shaders based on the results of the any hit and/or intersection shaders.

Figure 5:
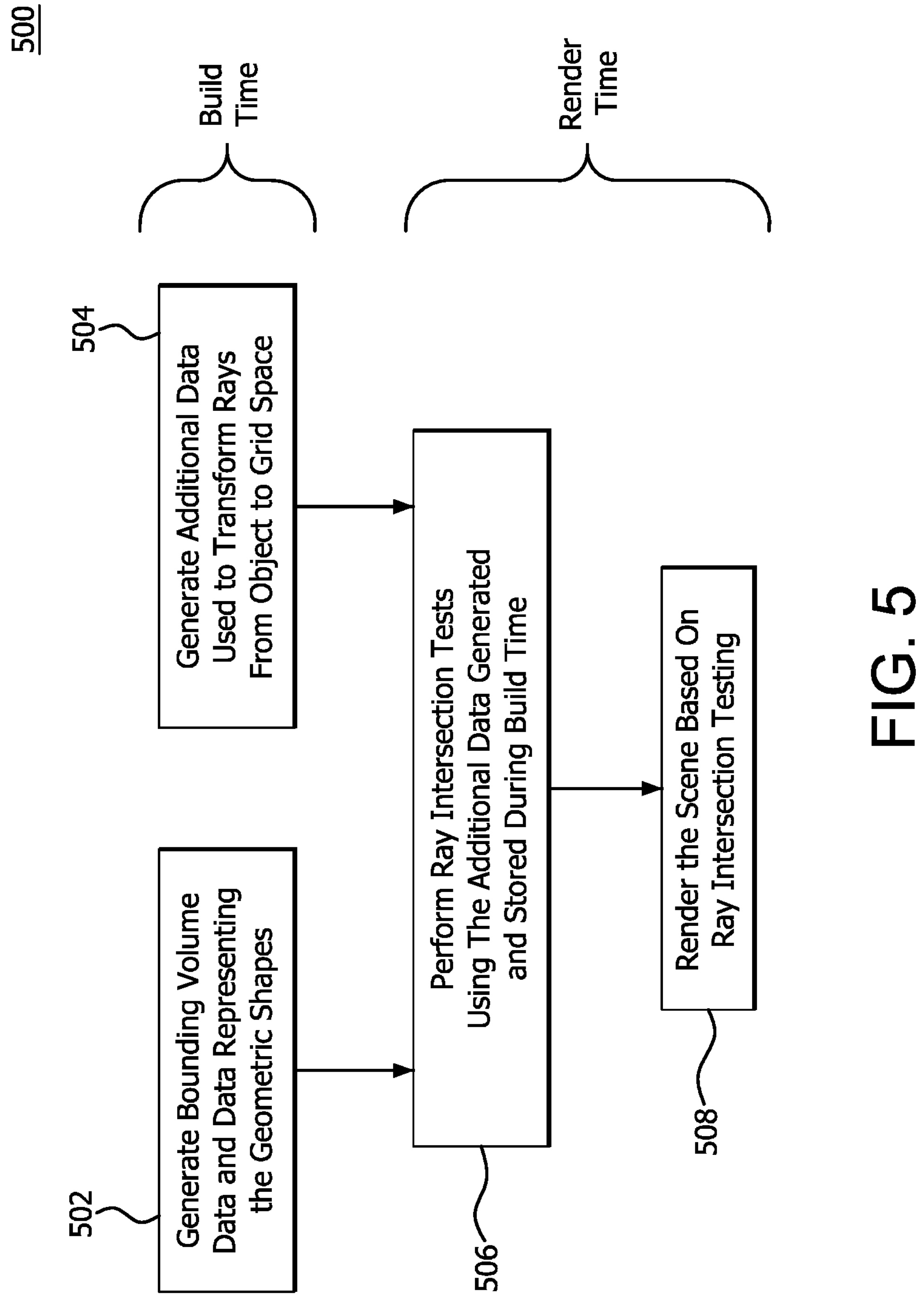
FIG. 5 is a flow diagram illustrating an example method of rendering objects in a scene using ray tracing according to features of the present disclosure.

FIG. 5 is a flow diagram illustrating an example method 500 for rendering objects in a scene using ray tracing according to features of the present disclosure. The method 500 is also described using the examples illustrated in FIGS. 6-8. Each of the tasks and functions described below with regard to the method 500 are, for example, executed on an accelerated processor such as APD 116.

The functions shown in blocks 502 and 504 are performed during the "build time." As described above, during the "build time," data structures (e.g., BVH structures) used to speed up the ray tracing process are constructed. After the data structures are constructed, the actual ray tracing (ray generation, intersection testing, shading, etc.) is performed during a "render time."

As shown at block 502, the method 500 includes generating the bounding volume data (e.g., in non-leaf nodes of the BVH) representing the approximate bounding volumes of a group of geometric shapes (e.g., triangles) of the BVH and the data representing the geometric shapes (e.g., in leaf nodes of the BVH).

As shown at block 504, the method 500 includes generating (e.g., computing), during the build time, additional data (data in addition to the data generated at block 502) that is used to transform rays from the object space to a fixed point space (e.g., a grid space). The additional data is then stored in memory as part of the BVH data (e.g., as part of the data for a corresponding node of the BVH). This additional data, which is generated and stored during "build time" (as part of the of the ray setup process), is data which is later accessed during "render time" to more efficiently perform the ray intersection testing. For example, the additional data represents values which are used to avoid or reduce the number of expensive (e.g., time consuming) arithmetic operations executed during "render time" to perform the ray intersection tests.

An example of this additional data, generated and stored during "build time," includes data representing a reciprocal of a bounding box dimension bounding one or more geometric shapes (e.g., one or more triangles). To transform a ray into a fixed point space, a point is determined (e.g., computed) on the ray inside the quantized grid space. The point is then converted during "render time" to its quantized representation by subtracting the point from, for example, the lower left hand corner of the quantized grid space in its world representation, performing an inverse operation to compute an inverse width (i.e., reciprocal width) of the grid space and then multiplying by the reciprocal width of the grid space and the dimension of the grid in world space. This inverse operation is costly if performed via hardware during "render time" and time consuming if performed via software during "render time."

Figure 6:
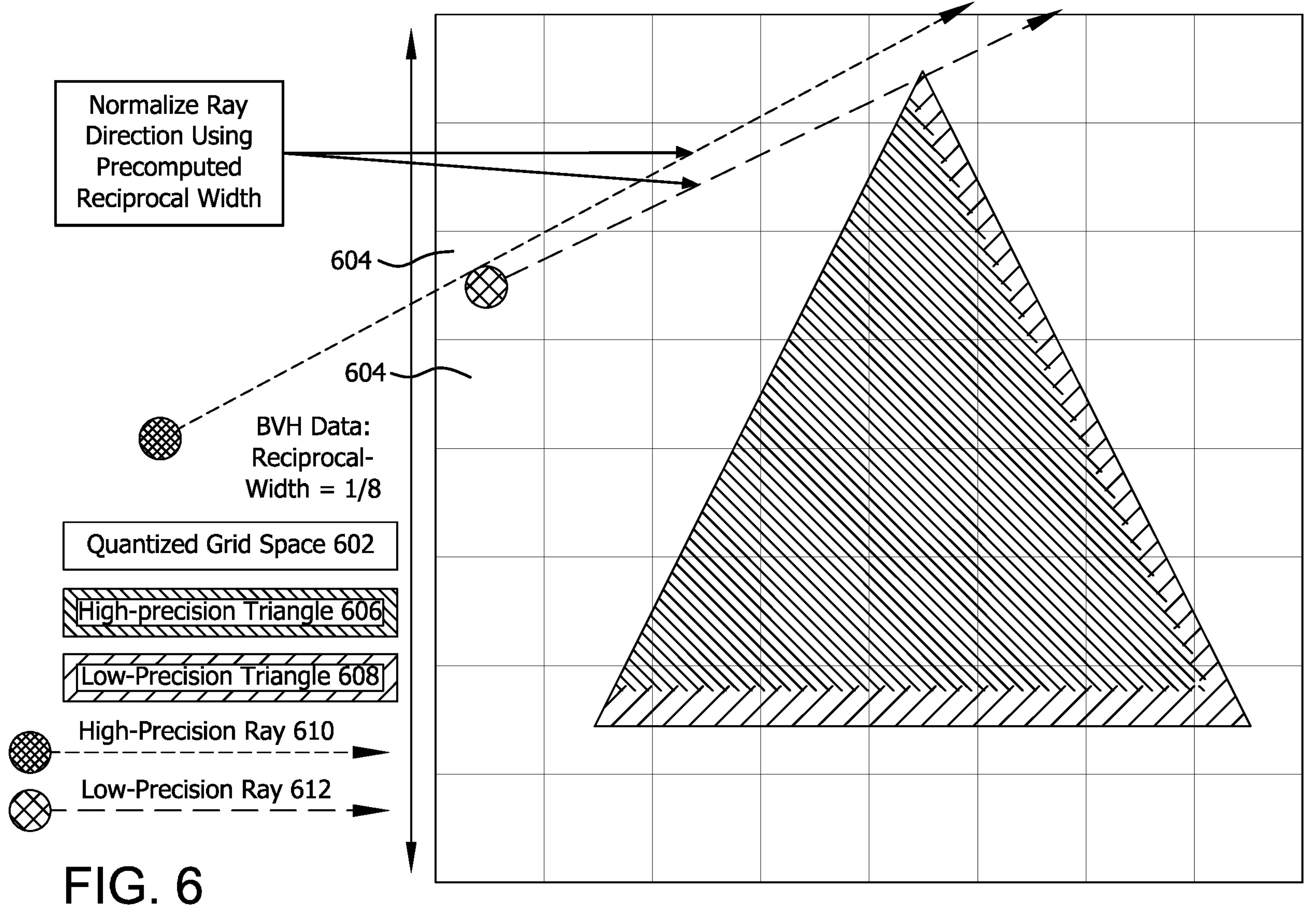
FIG. 6 is an illustration showing an example of additional data generated during "build time" used to efficiently transform a ray during "render time" according to features of the present disclosure.

FIG. 6 is an illustration showing an example of using the reciprocal width of a bounding box, which is generated and stored during "build time," as additional data to efficiently transform a ray and perform a ray intersection test according to features of the present disclosure.

The fixed point space is a grid space 602, representing a box which bounds a group of triangles. The grid space 602 shown in FIG. 6 is a fixed point space which has been rendered after transformation from the object space (e.g., world space). As shown in FIG. 6, grid space 602 comprises a matrix of same sized grid blocks 604 (resulting from scaling blocks during transformation).

The grid space 602 illustrates a high precision triangle 606 and its corresponding low precision triangle 608 (converted from the high precision triangle 606). For simplified explanation purposes, one high precision triangle and its corresponding low precision triangle is shown as bound by the grid space 602 (i.e., bounding box) in FIG. 6. Features of the present disclosure can be implemented, however, for grid spaces bounding any number of geometric shapes (e.g., triangles).

An example task executed as part of a ray intersection test during "render time" is a task to normalize the ray. For example, normalizing the ray is performed, during "render time" by dividing the ray direction by the size of the grid space, which defines the ray in the grid space (as opposed to the object space). However, by computing and storing the reciprocal of the grid space dimension during "build time," the task of normalizing the ray during "render time" can be changed from a division operation to a multiplication operation, which is performed more efficiently than a division operation. This reciprocal value may be stored in floating-point format or fixed point format. A value to be stored may also include the floating-point exponent or its reciprocal.

The grid space 602 represents a bounding box which bounds the volume of a group of triangles. The grid space is sized such that it tightly bounds (e.g., fits tightly around) the group of triangles. The size of the grid space in three dimensions around the triangles is defined, during "build time," for example based on the minimum vertex value (of each of the triangle vertices) in the X, Y and Z dimensions and the maximum vertex value in the X, Y and Z dimensions. The height and width of each box 604 in the grid space 602 can be defined as a power of 2 for more efficient operations and more efficient storage (e.g., memory) because the exponent can be stored instead of directly storing the width and the reciprocal then becomes the negative exponent.

In the example shown in FIG. 6, the width of the grid space 602 is 8, so the reciprocal width of the grid space 602 is computed as ⅛. This value, representing the reciprocal width of the grid space 602, is then stored during "build time" and is later accessed during "render time." The additional data representing the reciprocal value (e.g., BVH Data Reciprocal width=⅛ in FIG. 6) is stored in memory as part of the BVH data (e.g., as part of the node of the BVH corresponding to the grid space 602 which bounds the volume of the group of triangles). As shown in FIG. 6, the high precision ray 610 is transformed to the low precision ray 612 using the reciprocal width data generated and stored during "build time." By using the reciprocal data, generated and stored prior to "render time," the task of normalizing a ray during "render time" is changed from a division operation to a multiplication operation and the ray intersection testing can be performed more efficiently (e.g., less costly and/or quicker) than if the reciprocal width data is generated during "render time."

Another example of additional data, generated and stored during "build time," includes data representing minimum points (i.e., points of intersection closest to coordinate system origins in one of the X direction, the Y direction and the Z direction). The precision of these points can also be reduced to save additional storage space. For example, the values of these points can be represented using a bfloat16 format, which requires half the storage space compared to full single precision.

Figure 7:
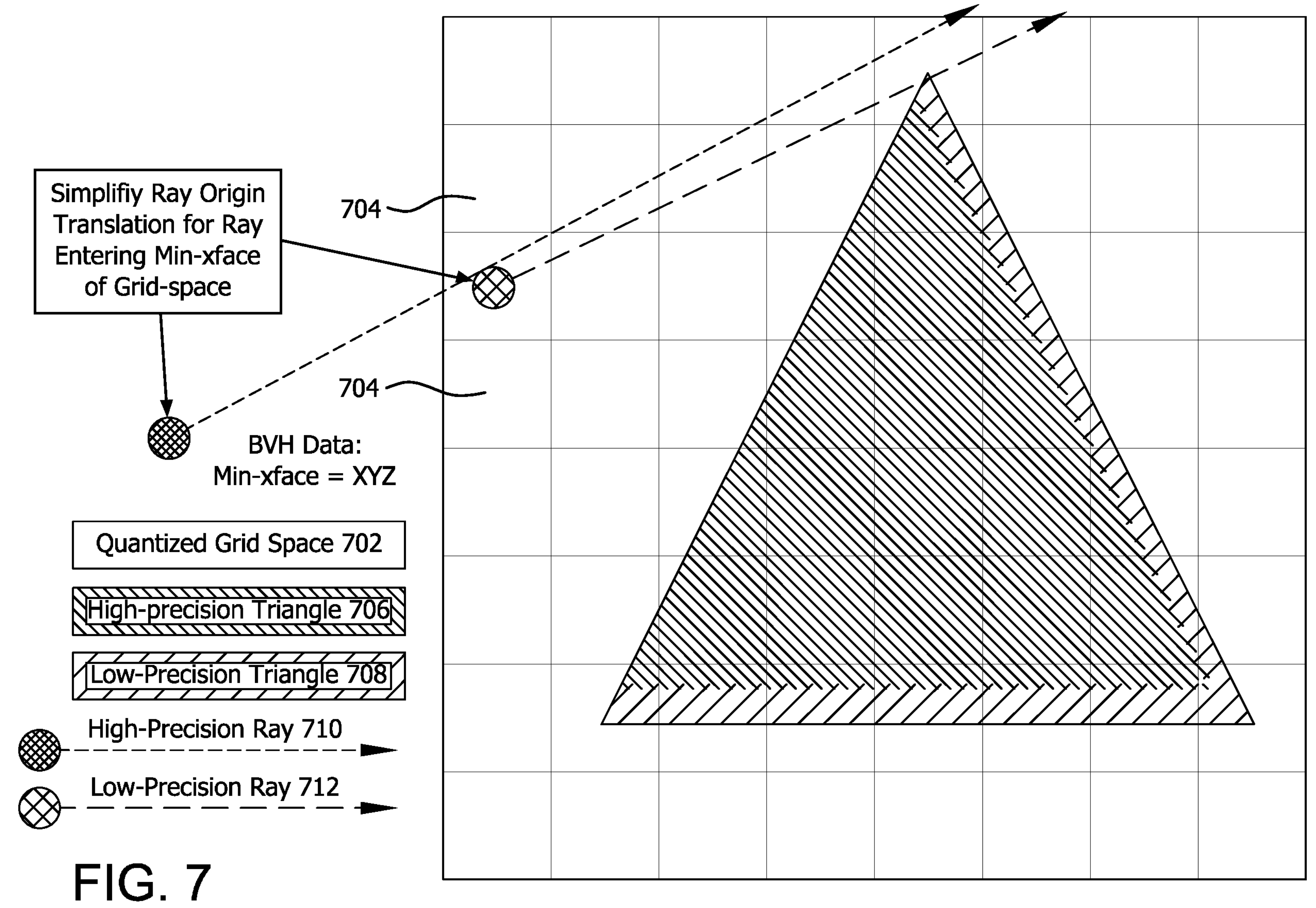
FIG. 7 is an illustration showing another example of additional data generated and stored during "build time" to transform a ray according to features of the present disclosure.

FIG. 7 is an illustration showing an example of using additional data representing minimum points (i.e., shown as BVH Data: Min-xface=XYZ in FIG. 7), as additional data generated and stored during "build time," to efficiently transform a ray and perform a ray intersection test, during render time, according to features of the present disclosure.

Typically, to determine the point of intersection along a ray, a multiply operation of direction x time is performed for intersection of each of the X plane, the Y plane and the Z plane. However, the multiplication operation for one of the dimensions can be eliminated by generating (computing), during "build time," which of the X plane, the Y plane and the Z plane includes the point of intersection closest to the ray origin. Then, that generated value is stored as the point along the ray in one of the X direction, the Y direction and the Z direction. Accordingly, while the value for the points of intersection for the other two directions is still generated during "render time" by performing the multiply operations, the value for the points of intersection along the ray in the one direction that is generated (computed) and stored during "build time" is later used to perform the ray intersection test more efficiently during "render time" by elimination one of the multiply operations.

The fixed point space is a grid space 702, representing a box which bounds a group of triangles. The grid space 702 shown in FIG. 7 is a fixed point space which has been rendered after transformation from the object space (e.g., world space). As shown in FIG. 7, grid space 702 comprises a matrix of same sized grid blocks 704 (resulting from scaling blocks during transformation).

The grid space 702 illustrates a high precision triangle 706 and its corresponding low precision triangle 708 (converted from the high precision triangle 706). For simplified explanation purposes, one high precision triangle and its corresponding low precision triangle is shown as bound by the grid space 602 (i.e., bounding box) in FIG. 7. Features of the present disclosure can be implemented, however, for grid spaces bounding any number of geometric shapes (e.g., triangles).

Another example of additional data, generated and stored during "build time," includes data representing quantized vertices locations in grid space.

The minimum point (points of intersection closest to ray origin) and size of the grid space 702 are determined and stored during build time. The high precision ray 710 origin and direction is transformed, during "render time" to the low precision ray 712 origin and direction using the minimum point and grid space size data generated and stored during "build time." As described above, the ray intersection test is then performed more efficiently during "render time" by eliminating one of the multiply operations.

Figure 8:
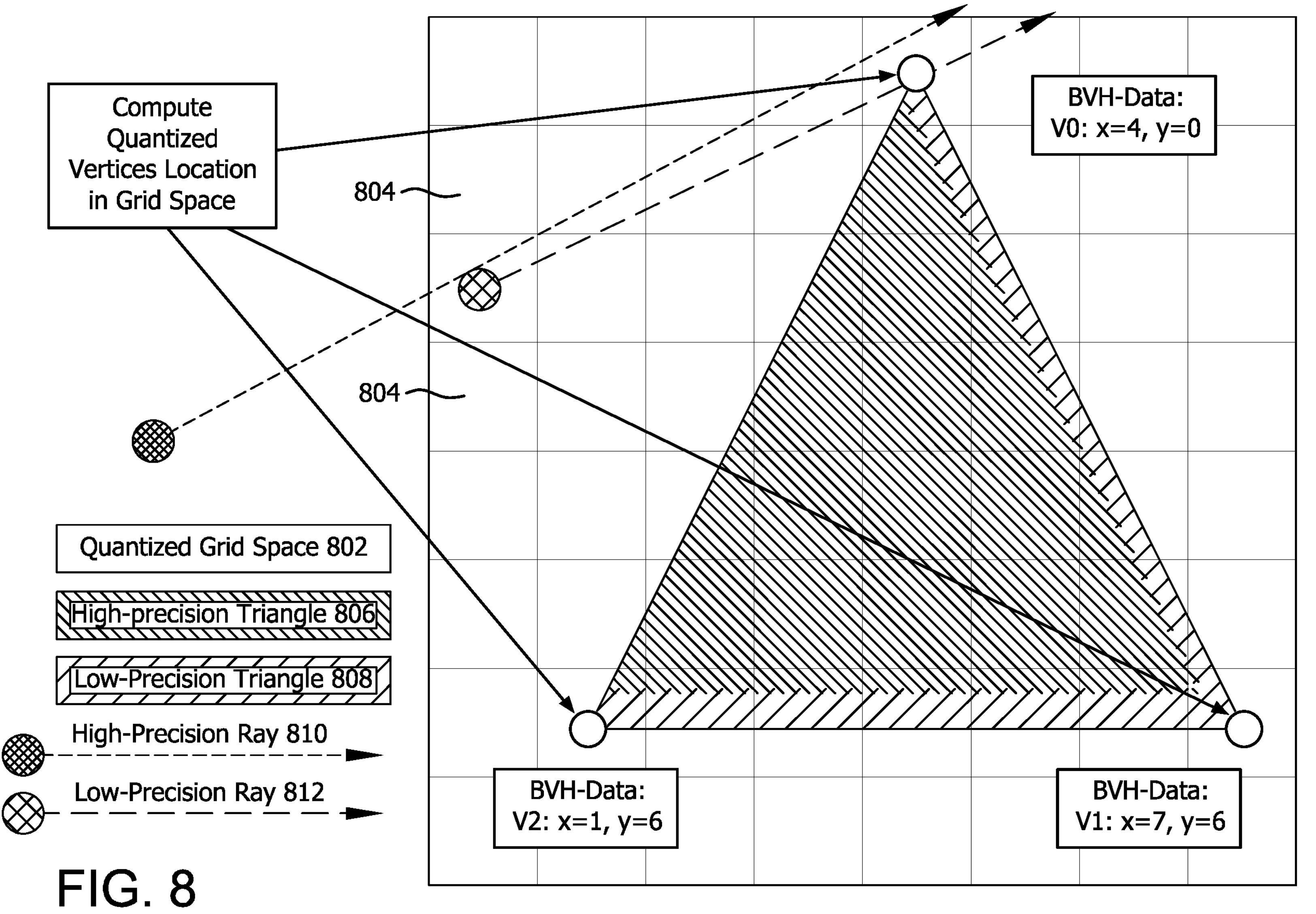
FIG. 8 is an illustration showing another example of additional data generated and stored during "build time" as part of the of the ray setup process includes data according to features of the present disclosure.

FIG. 8 is an illustration showing an example of using quantized vertices locations in grid space, as additional data generated and stored during "build time," to efficiently transform a ray and perform a ray intersection test according to features of the present disclosure.

The fixed point space is a grid space 802, representing a box which bounds a group of triangles. The grid space 802 shown in FIG. 8 is a fixed point space which has been rendered after transformation from the object space (e.g., world space). As shown in FIG. 8, grid space 802 comprises a matrix of same sized grid blocks 804 (resulting from scaling blocks during transformation).

The grid space 802 illustrates a high precision triangle 806 and its corresponding low precision triangle 808 (converted from the high precision triangle 806). For simplified explanation purposes, one high precision triangle and its corresponding low precision triangle is shown as bound by the grid space 602 (i.e., bounding box) in FIG. 8. Features of the present disclosure can be implemented, however, for grid spaces bounding any number of geometric shapes (e.g., triangles).

In the example shown in FIG. 8, additional data representing quantized vertices locations is shown as BVH Data V0: x=4, y=0; BVH Data V2: x=1, y=6; and BVH Data: V1: x=7, y=6). These values are merely examples.

The quantized vertices can be stored more compactly than the full precision vertices. That is, a larger number of low precision vertices (i.e., additional data representing the low precision vertices locations) can be stored together in memory, and full precision vertices data is only fetched for hits determined to be more likely (e.g., equal to or greater than a threshold hit probability). Accordingly, memory bandwidth is reduced.

The high precision ray 810 origin and direction are rounded to fixed point values and the high precision ray 810 origin and direction are transformed, during "render time" to the low precision ray 812 origin and direction. Thus, the ray is quantized equivalently to match the "build time" quantized vertices. Ray-triangle intersection test can then be performed using these reduced precision, fixed point values, while being conservative to compensate for lost precision. Performing arithmetic on reduced precision values is significantly simpler and therefore requires significantly less silicon area (i.e., multiple times less area) than arithmetic on full precision, and we expect that it should also use less power and reduce latency.

While the reduced precision test alone is insufficient to produce final full precision test results, the reduced precision test is used to efficiently eliminate most misses from consideration. Triangles that are found viable candidates for hits by the ray when using the reduced precision test can be followed up by entering the full precision ray/triangle test pipeline and are much more likely to produce hits there. That is, quickly testing at reduced precision facilitates saving full precision testing for cases where its likely to be productive.

FIGS. 6-8 are merely examples of types of additional data generated during "build time" to more efficiently transform rays from a world space to a grid space) and performing ray intersection tests. Features of the present disclosure can be implemented by generating various types of additional data during "build time" by, for example, precomputing grid space parameters to accelerate ray computation, aligning the grid space to a power of two in world space, converting a grid space from an arbitrary shaped grid space (i.e., with different edge lengths) to a cube shaped grid space with 3 same size edge lengths, which allows for more additional data to be generated (computed) during "build time" and later used during "render time."

Another example of additional data, generated and stored during "build time," includes data representing values which can be substituted for ray origin components based on the entering faces and exit faces of the bounding box or other planes within the box.

Each example of the additional data, generated and stored during "build time," described above can be compressed using various compression schemes (e.g., indexing, delta compression, and the like).

The functions shown in blocks 506 and 508 are performed during a "render time." As described above, after the data structures are constructed, the actual ray tracing (ray generation, intersection testing, shading, etc.) is performed during a "render time."

As shown at block 506, the method 500 includes performing ray intersection tests. That is, each ray cast into the grid space (e.g., grid space 602, 702, 802) is tested for intersection with all geometric shapes (e.g., triangles representing objects) in the grid space to determine the object (corresponding to a geometric shape) that the ray hits first (if any). As described above, ray intersection is a computationally expensive step, especially for complex scenes.

As shown at block 508, the objects in the scene are rendered based on the ray intersection testing performed at block 506. For example, the objects in the scene are rendered for display on a display device (e.g., display device 118). Although not specifically shown in FIG. 5, the render time can also include other tasks, such as shading, to render a scene.

As a result of generating and storing the additional data (at block 504) during the "build time" (i.e., prior to "render time"), the ray intersection testing can be performed more efficiently. Accordingly, the number of ray intersection tests performed per clock cycle can be increased without increasing the amount of memory (i.e., without increasing silicon area cost).

It should be understood that many variations are possible based on the disclosure herein. Although features and elements are described above in particular combinations, each feature or element can be used alone without the other features and elements or in various combinations with or without other features and elements.

The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements aspects of the embodiments.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for rendering objects in a scene using ray tracing, the method comprising:

during a build time:

generating an accelerated hierarchy structure comprising data representing an approximate volume bounding a group of geometric shapes representing the objects in the scene and data representing the geometric shapes; and generating additional data to transform rays cast in the scene from a high precision space to a low precision space, wherein the additional data is different from the data representing the approximate volume; and during a render time occurring after the build time:

performing ray intersection tests, using the additional data generated during the build time, for the rays in the scene; and rendering the scene based on the ray intersection tests.

2. The method of claim 1, wherein the accelerated hierarchy structure is a bounding volume hierarchy (BVH) structure.

3. The method of claim 2, wherein the low precision space is a grid space which bounds the group of geometric shapes and the method further comprises:

storing, during the build time, the additional data in a portion of memory for a node of the BVH which comprises the data representing the approximate volume bounding the group of geometric shapes; and performing, during the render time, the ray intersection tests for rays cast into the grid space by accessing the additional data from the portion of the memory.

4. The method of claim 1, further comprising:

storing, during the build time, the additional data in a portion of memory; and transforming, during the render time, the rays from the high precision space to the low precision space using the additional data in the portion of the memory.

5. The method of claim 4, wherein the transforming comprises normalizing, for each ray, an origin and a direction of the ray in the high precision space to a unit of the low precision space.

6. The method of claim 1, wherein the additional data includes values which are accessed during the render time to reduce a number of operations to perform each ray intersection test.

7. The method of claim 1, wherein the additional data comprises data representing a reciprocal of dimensions of a bounding box bounding the group of geometric shapes.

8. The method of claim 1, wherein the additional data comprises data representing at least one of minimum points, center points or maximum points of a bounding box bounding the group of geometric shapes.

9. The method of claim 1, wherein the additional data comprises data representing quantized vertices locations in a bounding box bounding the group of geometric shapes.

10. A processing device for rendering objects in a scene using ray tracing, the processing device comprising:

memory; and a processor configured to:

during a build time:

generate an accelerated hierarchy structure comprising data representing an approximate volume bounding a group of geometric shapes representing the objects in the scene and data representing the geometric shapes; and generate additional data to transform rays, to be cast in the scene from a high precision space to a low precision space, wherein the additional data is different from the data representing the approximate volume; and during a render time occurring after the build time:

perform ray intersection tests, using the additional data generated during the build time, for the rays in the scene; and render the scene based on the ray intersection tests.

11. The processing device of claim 10, wherein the accelerated hierarchy structure is a bounding volume hierarchy (BVH) structure.

12. The processing device of claim 11, wherein the low precision space is a grid space which bounds the group of geometric shapes and the processor is configured to:

store, during the build time, the additional data in a portion of the memory for a node of the BVH which comprises the data representing the approximate volume bounding the group of geometric shapes; and perform, during the render time, the ray intersection tests for rays cast into the grid space by accessing the additional data from the portion of the memory.

13. The processing device of claim 10, wherein the processor is configured to:

store, during the build time, the additional data in a portion of the memory; and transform, during the render time, the rays from the high precision space to the low precision space using the additional data in the portion of the memory.

14. The processing device of claim 13, wherein the processor is configured to transform each ray by normalizing an origin and a direction of a corresponding ray in the high precision space to a unit of the low precision space.

15. The processing device of claim 10, further comprising a display device, wherein the objects in the scene are rendered for display on the display device.

16. The processing device of claim 10, wherein the additional data comprises data representing a reciprocal of dimensions of a bounding box bounding the group of geometric shapes.

17. The processing device of claim 10, wherein the additional data comprises data representing at least one of minimum points, center points or maximum points of a bounding box bounding the group of geometric shapes.

18. The processing device of claim 10, wherein the additional data comprises data representing quantized vertices locations in a bounding box bounding the group of geometric shapes.

19. A non-transitory computer readable medium comprising instructions thereon for causing a computer to execute a method for rendering objects in a scene using ray tracing, the instructions comprising:

during a build time:

generating an accelerated hierarchy structure comprising data representing an approximate volume bounding a group of geometric shapes representing the objects in the scene and data representing the geometric shapes; and generating additional data to transform rays, to be cast in the scene from a high precision space to a low precision space, wherein the additional data is different from the data representing the approximate volume; and during a render time occurring after the build time:

performing ray intersection tests, using the additional data generated during the build time, for the rays in the scene; and rendering the scene based on the ray intersection tests.

20. The non-transitory computer readable medium of claim 19, wherein the accelerated hierarchy structure is a bounding volume hierarchy (BVH) structure.

* * * * *